United States Patent [19]

Snyder et al.

[11] Patent Number: 4,467,907
[45] Date of Patent: Aug. 28, 1984

[54] FAST-DUMP FEEDING APPARATUS FOR INDIVIDUALLY FEEDING FASTENER PARTS

[75] Inventors: George R. Snyder, Woodbridge; Walter H. Dziura, Naugatuck, both of Conn.

[73] Assignee: Scovill Inc., Waterbury, Conn.

[21] Appl. No.: 408,753

[22] Filed: Aug. 17, 1982

[51] Int. Cl.³ .................. B65G 47/24; B65G 47/19
[52] U.S. Cl. .................. 198/368; 221/278; 221/252; 198/443; 198/532
[58] Field of Search .......... 198/396, 397, 443, 530, 198/532, 540, 562, 493, 491, 368; 221/166, 241, 289, 301, 278, 252; 222/556; 406/93

[56] References Cited

U.S. PATENT DOCUMENTS

| | | | |
|---|---|---|---|
| 817,780 | 4/1906 | Jones | 221/232 |
| 1,178,679 | 4/1916 | Pullen | 221/251 |
| 1,913,648 | 6/1933 | Warner | 221/166 |
| 3,058,569 | 10/1962 | Frank et al. | 198/491 |
| 3,265,185 | 8/1966 | Weselik | 198/396 |
| 3,993,216 | 11/1976 | Poole | 221/278 |
| 4,410,103 | 10/1983 | Fuhrmeister | 221/278 |

Primary Examiner—Joseph E. Valenza
Assistant Examiner—Daniel R. Alexander
Attorney, Agent, or Firm—Dallett Hoopes

[57] ABSTRACT

Fast-dump feeding apparatus includes a hopper having an associated vertical feed chute. The hopper is formed with an openable door at its lower end and the feed chute is bottomed by a shutter. Both door and shutter may be opened to permit rapid evacuation of the hopper and chute. A pusher having a path across the top of the shutter is adapted to push individual fastener parts through a side opening in the chute immediately above the shutter. The pusher includes a pneumatic channel terminating at the front of the pusher to direct a blast of air toward the individual part to assist in moving it away from the chute.

4 Claims, 10 Drawing Figures

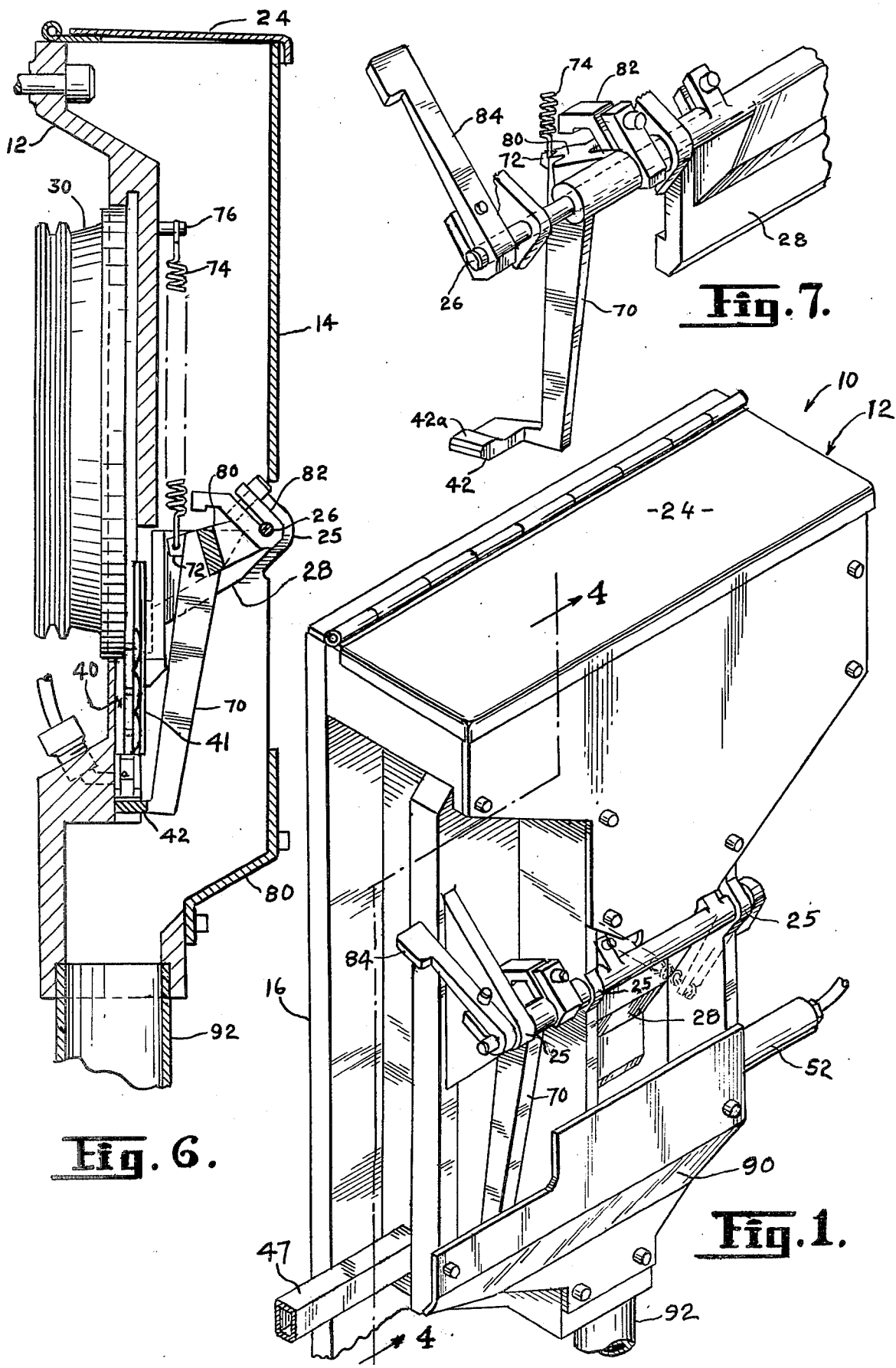

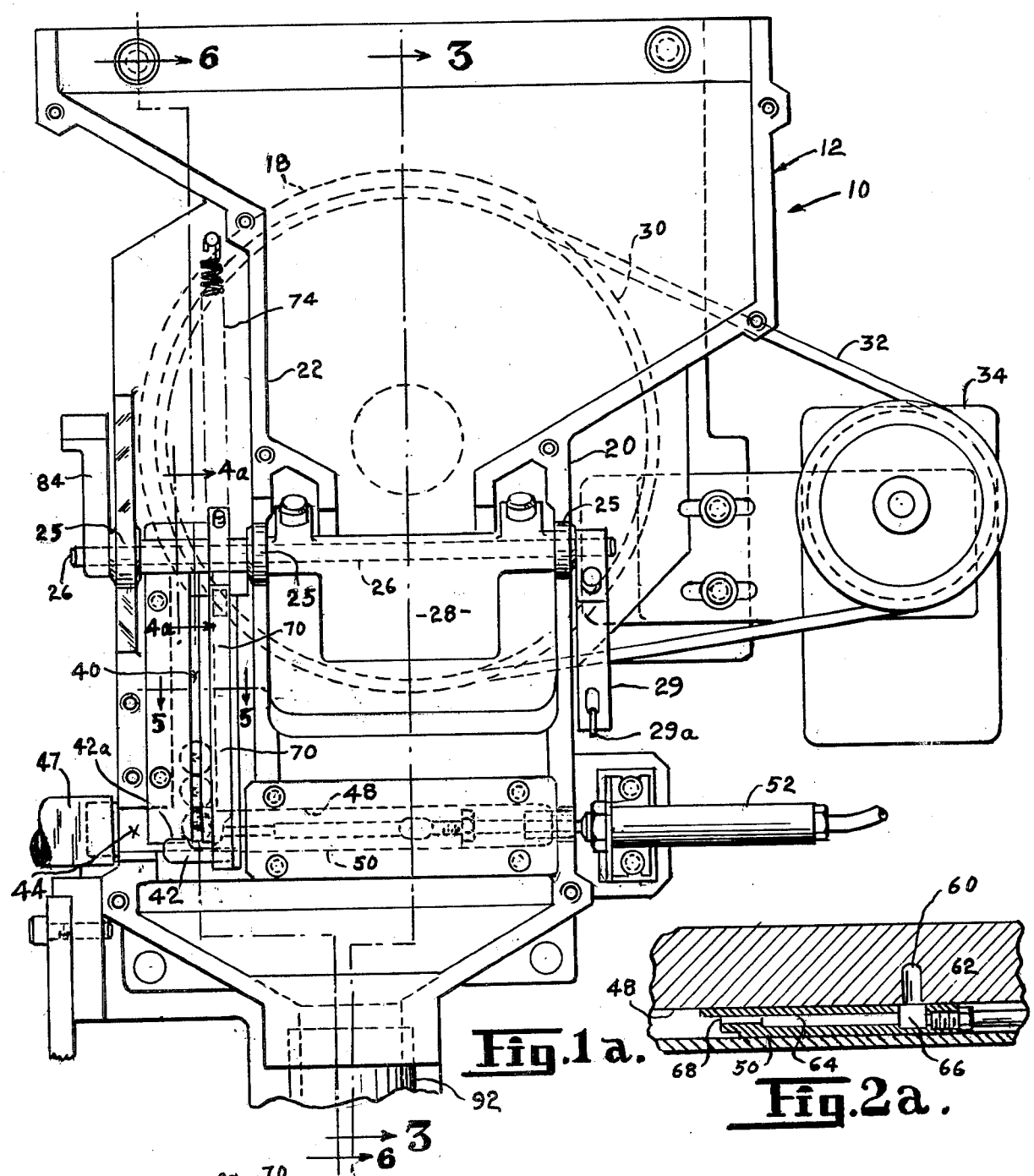
Fig.1a.
Fig.2a.
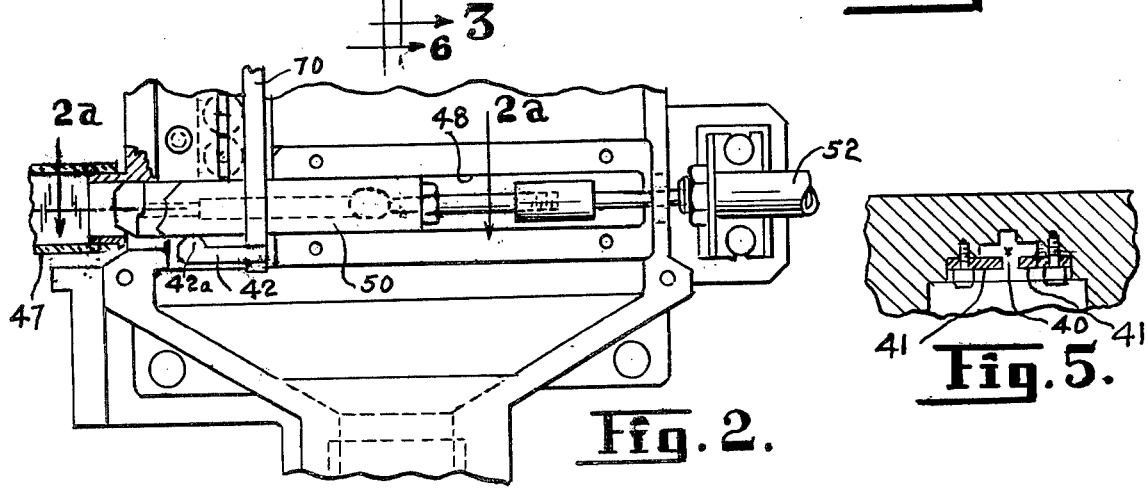
Fig.2.
Fig.5.

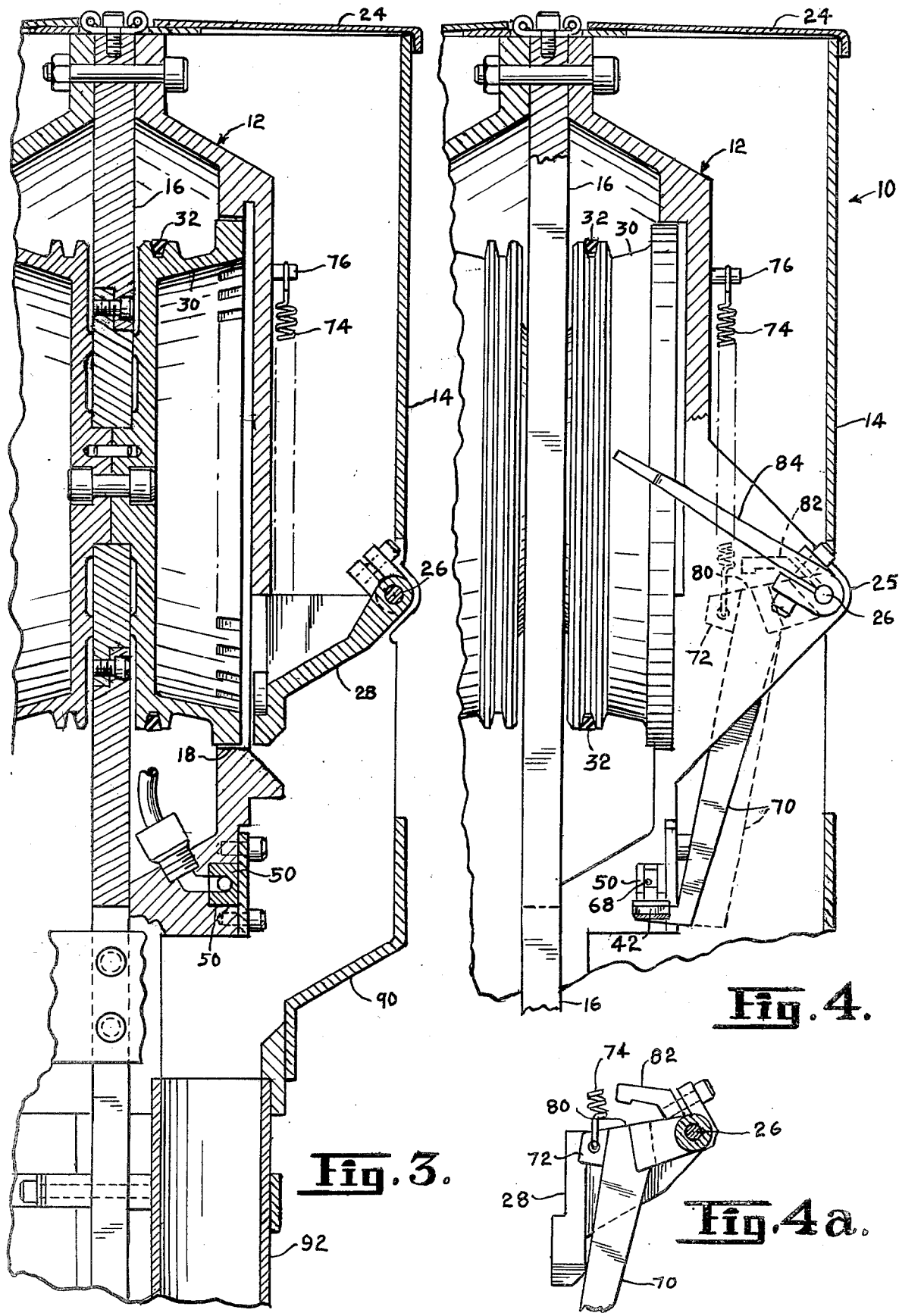

FAST-DUMP FEEDING APPARATUS FOR INDIVIDUALLY FEEDING FASTENER PARTS

BACKGROUND OF THE INVENTION

1. Field of the Invention

This invention relates to a fast-dump feeding apparatus especially useful in feeding snap fastener parts one-by-one to a snap fastener setting machine. A special feature of the invention is means for evacuating its parts rapidly so that the parts may be replaced with parts of a different structure, size, color, etc.

2. Description of the Prior Art

In the prior art there are many apparatuses for feeding parts to snap fastener attaching machines. As examples, attention is directed to U.S. Pat. No. 1,913,648 which issued June 13, 1933 to Warner, and U.S. Pat. No. 1,982,902 which issued Dec. 4, 1934 to Clark. Each of these patents shows hoppers and downward chutes. Rotary drive means deposit parts in proper orientation in the chute.

One of the deficiencies of the earlier devices is the lack of easy means for instantaneously evacuating the hopper and chute to permit replacement of the supply of snap fastener parts with parts of different character, that is, structure, color, size, etc.

SUMMARY OF THE INVENTION

Under the present invention, a more or less conventional hopper having a discharge chute disposed therein and rotary drive means is equipped with a fast-dump facility. This includes an openable door at the bottom of the hopper and a movable shutter at the bottom of the chute, both of which are operable virtually instantaneously to evacuate the supply of snap fastener parts from both hopper and chute. The bottom of the chute is equipped with a transversely moving finger having air blast means to drive the parts singly to the setting die.

BRIEF DESCRIPTION OF THE DRAWINGS

Further objects and features of the invention will be apparent from the following specification including the drawings and claims, all of which relate to a preferred non-limiting embodiment of the invention. In the drawings:

FIG. 1 is a perspective view of an apparatus embodying the invention;

FIG. 1a is a partly sectional side elevational view;

FIG. 2 is a fragmentary view showing the feed finger with its cover plate removed and with the finger extended to the outer end of its travel, the closure plates are broken off in this view;

FIG. 2a is a fragmentary sectional view along the line 2a—2a of FIG. 2;

FIG. 3 is a fragmentary sectional view taken on the line 3—3 of FIG. 1a;

FIG. 4 is a fragmentary sectional view taken on the line 4—4 of FIG. 1;

FIG. 4a is a fragmentary sectional view taken on the line 4a—4a of FIG. 1a;

FIG. 5 is a fragmentary sectional view taken on the line 5—5 of FIG. 1a;

FIG. 6 is a sectional view taken on the line 6—6 of FIG. 1a; and

FIG. 7 is a perspective view of the dump door and associated parts.

DESCRIPTION OF THE PREFERRED EMBODIMENT

The preferred form of the invention disclosed in the drawings is generally designated 10 in FIG. 1. It comprises a hopper 12 having a sidewall 14, an inner wall 16, and a bottom arc 18 (FIG. 3). A rear wall 20 and a front wall 22, together with a hinged top wall 24, complete the enclosure. The front and rear walls are formed with journal means 25 and a rod 26 is journaled therein and supports an openable dump door 28 which forms an inclined portion of the bottom arc 18 (FIG. 3). Fixedly secured to the rod 26 at one end is the crank 29. To the distal end of crank 29 is attached a spring 29a anchored to the hopper frame. Crank 29 and spring 29a bias the door 28 closed.

It is understood that, in the version shown, the unit comprises two complementary hoppers, mirror images of each other, which are disposed on the opposite sides of the inner wall 16. To conserve drawing space, the drawings focus on only the rightward hopper as shown in FIG. 3, the leftward hopper being broken away. It is understood that the purpose of the two complementary hoppers is to provide supplies for two different individual fastener parts such as socket and prong ring; or post and stud.

As is conventional, the hopper includes the rotary circumferentially pocketed drum 30 journaled in the inner wall 16 and driven through belt 32 by the motor 34.

Positioned at the side of the hopper and extending down from the front wall 22 thereof is a chute 40 (FIGS. 1a, 6) for snap fastener parts. The upper end of the chute is adjacent the rotating drum 30 so that as snap fastener parts move about upon the periphery of the drum, they are delivered individually as vacancies occur in the top of the chute 40, with the individual snap fastener parts properly oriented. As shown in FIG. 5, the chute 40 is profiled with closure plates 41 to hold the parts in stacked relation and oriented all in the same direction as they come off the drum.

The lower end of the chute 40 is blocked off with a shutter 42 against which rests the lower end of the fastener part stack (FIG. 1a). Immediately above the shutter 42 is a cross passage 44. Aligned with the cross passage 44 is the opening of a tube 47 which conveys parts therein to the setting die of the setting machine (not shown).

Also aligned with the passage 44 is the bore of a guideway 48 which houses a pusher finger 50. The pusher finger is powered by a pneumatic cylinder 52.

Referring to FIG. 1a, the pusher 50 is in retracted position. As it approaches extended position, the pusher (FIG. 2) drives the lower of the stacked fastener parts to the opening of the delivery tube 47.

As shown in FIG. 2a, the movement of the individual fastener part down the tube 47 may be facilitated by a blast of compressed air out the front end of the pusher 50. Note that the guideway 48 includes a fixed pressurized air passage 60 which terminates adjacent the finger 50 in an opening 62. The finger includes an L-shaped passage 64 comprising a longitudinal bore in the finger 50 and a connecting transverse bore 66. When the finger is in extended position (FIGS. 2, 2a), the bore 66 and the opening 62 in the guideway are aligned so that a flow of air is established blasting an air jet out through the opening 68 in the front end of the finger. This blast urges the individual snap fastener part through the tube 47 to the setting die. It will be understood that once the part enters the tube, it is the next part to be set. The tube conveys only one part at a time from the hopper to the setting die.

To avoid the premature or unintentional movement of an individual snap fastener part into the tube, the shutter 42 is formed with an upward rib 42a adjacent its front end. It is over this rib 42a that the finger 50 pushes the snap fastener part and starts its travel into and down the tube 47.

Turning now to the mounting of the shutter 42, it should be noted that the shutter is formed with an upwardly extending arm 70 (FIGS. 4, 7) which is rotatably mounted on the shaft 26 of the door 28. The arm 70 preferably includes an eye 72, and a spring 74 extends between the eye 72 and a boss 76 at the upper end of the hopper to urge the shutter 42 in closed disposition.

So that the cyclical opening and closing of the shutter 42 as the finger 50 noses its way over the rib 42a (FIG. 2) will not cause the door 28 to crack open, lost motion means are provided. These means permit the limited oscillation of arm 70 without movement of the door 28. The lost motion means are best shown in the sectional view FIG. 4a and perspective view FIG. 7 wherein the arm 70 includes the upwardly-facing platform 80 which is normally spaced from but adjacent the knuckle 82 rigidly mounted on shaft 26.

Included in the elements of the assembly is a dumping lever 84 (FIGS. 1, 4, and 7) secured to the shaft 26.

A funnel-like guide 90 is mounted on the hopper 12 beneath the door 28 and chute 40 to receive evacuated parts. It connects to a discharge tube 92 (FIG. 3) leading to a storage or waste bin (not shown).

The operation of the apparatus embodying the invention has been alluded to from time to time in connection with the description of the structure and one skilled in the art has probably been able to infer all steps thereof.

In summary, a supply of fastener parts is delivered into the hopper 12 through the hinged top wall 24 and then directed by the inclined wall of the door 28 into the cavities of rotating drum 30. The motor 34 is started and the delivery and orientating drum 30 rotates continuously delivering orientated fasteners to the top of the chute 40 which quickly fills. Before the associated setting die (not shown) is operated, cylinder 52 is activated to drive the finger 50 forwardly from the position shown in FIG. 1a to the position shown in FIG. 2. This moves the lowermost snap fastener part in the chute leftwardly (FIG. 1a) over rib 42a into the mouth of the tube 47. This operation involves the nosing of the finger 50 over the rib 42a on shutter 42 with a consequent slight opening of the shutter and flexing of the spring 74 without the opening of the door 28 due to the lost motion arrangement described. This is accompanied by a blast of air out the jet opening 68 to speed the part on its way down the tube 47 to the setting die. This action is repeated as necessary each time a part is set.

When it is desired to change the supply of parts to parts of a different color or structure, etc., the dumping lever 84 (FIG. 4) is depressed causing the movement of the door 28 forwardly as shown in FIG. 1a and rightwardly as shown in FIG. 4 to permit the downward evacuation of the parts in the hopper 12. Further downward movement of the lever 84 causes the opening of the shutter 42 to permit the evacuation by gravity of all parts in the chute 40. All such parts are guided by the funnel 90 down the discharge chute 92 to storage or waste bin (not shown). Promptly thereafter, the operator may place a fresh supply of parts in the hopper 12 for immediate use on the next garment. Because there are no leftover parts of the previously worked variety in the tube, chute, or hopper, the switchover to the new part is immediate.

It will be clear that the present apparatus fills a need for a fast-dump feeding apparatus for snap fastener parts or the like. The unit described is especially desirable for its reliability and simplicity.

Having described an embodiment of my invention, I desire to be limited only by the ambit of the following claim language and its equivalents.

I claim:

1. A fast-dump feeding apparatus for individually feeding fastener parts comprising:
  (a) a hopper having an openable door at the lower end thereof;
  (b) a vertical chute integral with the side of the hopper and accessible to the inside of the hopper;
  (c) drive means for moving parts from the bottom of the hopper to the vertical chute;
  (d) a movable horizontal shutter at the lower end of the vertical chute;
  (e) a pusher having a path across the top of the movable shutter and adapted to push individual fastener parts through a side opening in the chute immediately above the shutter; and
  (f) operating means associated with the shutter and the door to open them; whereby upon operation of the operable means the door and the shutter will open to permit rapid downward evacuation of the individual parts in the hopper and chute.

2. A fast-dump feeding apparatus as claimed in claim 1 wherein the shutter carries rib means to avoid the unintentional movement of individual parts out the opening.

3. A fast-dump feeding apparatus as claimed in claim 1 wherein the operable means includes means linking the door and shutter to a common operating rod.

4. A fast-dump feeding apparatus as claimed in claim 1 wherein the pusher includes a pneumatic channel terminating at the front of the pusher to direct a blast of air toward the individual part to assist in moving it away from the chute.

* * * * *